United States Patent
Oates et al.

(10) Patent No.: US 9,651,199 B1
(45) Date of Patent: *May 16, 2017

(54) HYDROGEN SUPPLY METHOD AND SYSTEM

(71) Applicants: Rommel M. Oates, Spring, TX (US);
Solomon Dadebo, Spring, TX (US)

(72) Inventors: Rommel M. Oates, Spring, TX (US);
Solomon Dadebo, Spring, TX (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,035

(22) Filed: Jan. 16, 2017

Related U.S. Application Data

(63) Continuation of application No. 14/574,945, filed on Feb. 18, 2014, now Pat. No. 9,574,715, which is a
(Continued)

(51) Int. Cl.
*F17D 3/00* (2006.01)
*F17D 1/02* (2006.01)
(Continued)

(52) U.S. Cl.
CPC .............. *F17D 3/00* (2013.01); *B65G 5/00* (2013.01); *F17C 1/007* (2013.01); *F17D 1/02* (2013.01);
(Continued)

(58) Field of Classification Search
CPC F17C 2221/012; F17C 2227/00; F17C 1/007; F17D 1/02; F17D 3/00;
(Continued)

(56) References Cited

U.S. PATENT DOCUMENTS 2,878,165 A 3/1959 Cottle
3,438,203 A 4/1969 Lamb et al.
(Continued)

FOREIGN PATENT DOCUMENTS

JP 58 191399 A 11/1983
WO WO 02-097321 A1 12/2002

OTHER PUBLICATIONS

16 Tex. Admin. Code§ 3.97 (2007); Id. (1994).
(Continued)

*Primary Examiner* — Michael R Reid
(74) *Attorney, Agent, or Firm* — Nilay S. Dalal

(57) ABSTRACT

A method and system for supplying additional hydrogen from a reservoir of stored hydrogen in a salt cavern to a hydrogen pipeline to assist in meeting customer demand for hydrogen is provided. Contaminants introduced while the stored hydrogen stream is in the salt cavern may cause the crude hydrogen stream to not have the required product purity specification. The stored hydrogen is removed from the salt cavern as a crude hydrogen stream and thereafter diluted with higher purity hydrogen formed from the pipeline to form a hydrogen product stream at or below the product purity specification. The hydrogen product can be formed without removal of any of the contaminants in the crude stream, thereby creating a more cost effective and simplified supply process compared to conventional processes employing a salt cavern for hydrogen supply.

23 Claims, 2 Drawing Sheets

Related U.S. Application Data continuation of application No. 13/398,482, filed on Feb. 16, 2012, now Pat. No. 8,950,419.

(51) Int. Cl.
*B65G 5/00* (2006.01)
*F17C 1/00* (2006.01)

(52) U.S. Cl.
CPC ...... *F17C 2221/012* (2013.01); *F17C 2223/0123* (2013.01); *F17C 2227/00* (2013.01)

(58) Field of Classification Search
CPC ............... B65G 5/00; Y10T 137/0329; Y10T 137/0335; Y10T 137/2499; Y10T 137/2509; Y10T 137/402
USPC .............. 137/3, 4, 88, 93, 236.1; 405/53, 59
See application file for complete search history.

(56) References Cited

U.S. PATENT DOCUMENTS

| | | | |
|---|---|---|---|
| 3,807,181 A | 4/1974 | Kuhne | |
| 4,025,321 A | 5/1977 | Anderson et al. | |
| 4,183,369 A | 1/1980 | Thomas | |
| 4,353,214 A | 10/1982 | Gardner | |
| 4,365,978 A | 12/1982 | Scott | |
| 4,444,727 A | 4/1984 | Yanagihara | |
| 4,577,999 A | 3/1986 | Lindorfer et al. | |
| 4,592,677 A | 6/1986 | Washer | |
| 4,626,131 A | 12/1986 | Glew et al. | |
| 4,725,381 A | 2/1988 | Pinto | |
| 4,830,056 A | 5/1989 | Chamberlain | |
| 5,511,905 A | 4/1996 | Bishop et al. | |
| 5,526,280 A | 6/1996 | Consadori et al. | |
| 5,669,734 A | 9/1997 | Becnel, Jr. et al. | |
| 5,842,519 A | 12/1998 | Sydansk | |
| 6,080,306 A | 6/2000 | Falkner | |
| 6,503,299 B2 | 1/2003 | Baksh et al. | |
| 6,511,528 B1 | 1/2003 | Lansbarkis et al. | |
| 6,576,138 B2 | 6/2003 | Sateria et al. | |
| 6,581,618 B2 | 6/2003 | Hill et al. | |
| 6,880,348 B2 | 4/2005 | Bishop et al. | |
| 7,078,011 B2 * | 7/2006 | Morrow | B01D 53/0462 423/220 |
| 7,152,675 B2 | 12/2006 | Heard | |
| 7,438,079 B2 * | 10/2008 | Cohen | B01F 3/028 137/3 |
| 8,425,149 B2 | 4/2013 | Drnevich | |
| 8,690,476 B2 | 4/2014 | Oates | |
| 8,757,926 B2 | 6/2014 | Drnevich | |
| 8,950,419 B2 * | 2/2015 | Oates | F17D 1/00 137/236.1 |
| 9,278,807 B2 | 3/2016 | Drnevich | |
| 9,284,120 B2 | 3/2016 | Oates | |
| 2004/0123738 A1 | 7/2004 | Spencer | |
| 2005/0220704 A1 | 10/2005 | Morrow et al. | |
| 2006/0216811 A1 | 9/2006 | Cunningham et al. | |
| 2009/0010714 A1 | 1/2009 | Bishop | |
| 2009/0184517 A1 | 7/2009 | Mukai | |
| 2010/0101789 A1 | 4/2010 | Dickinson et al. | |
| 2010/0163804 A1 * | 7/2010 | Schenck | C01B 3/12 252/373 |
| 2010/0200229 A1 | 8/2010 | Jefferd | |
| 2011/0305515 A1 | 12/2011 | Drnevich | |
| 2013/0213479 A1 | 8/2013 | Oates et al. | |
| 2013/0315669 A1 | 11/2013 | Oates | |
| 2014/0161533 A1 | 6/2014 | Oates | |
| 2014/0241802 A1 | 8/2014 | Drnevich | |
| 2015/0101672 A1 | 4/2015 | Oates et al. | |
| 2016/0046442 A1 | 2/2016 | Oates | |
| 2016/0046443 A1 | 2/2016 | Oates | |
| 2016/0060038 A1 | 3/2016 | Oates | |
| 2016/0089705 A1 | 3/2016 | Oates | |
| 2016/0122128 A1 | 5/2016 | Drnevich | |

OTHER PUBLICATIONS

2006 International Pipeline Conference materials.
Adams, J., TransGas Limited "Natural Gas Salt Cavern Storage Operating Pressure Determination". Petroleum Society of CIM, Paper No. 97-180. Presented at Seventh Petroleum Conf. of S. Saskatchewan Section, the Petroleum Society of CIM (Oct. 19-22, 1997) 14 pages.
ASTM E534-91. "Standard Test Methods for Chemical Analysis of Sodium Chloride". (Published Oct. 1991) 122 pgs. Incorporated in Technology of Tutorial by Dr. Joe L. Ratigan.
Bear, Jacob. "Dynamics of Fluides in Porous Media". American Elsevier Publishing Co., Inc. New York. (No date avaliable). p. 136. Incorporated in Technology Tutorial by Dr. Joe L. Ratigan.
Bérest, P. et al. "Salt Permeability Testing—2001-8-SMRI-Part 1—The Influence of Permeability and Stress on Spherical Hollow Salt Samples". Solution Mining Research Inst. Research Project Report No. 20901-8-SMRI (Oct. 2001). 15 pgs. Incorporated in Technology Tutorial by Dr. Joe L. Ratigan.
Bérest, P. et al. "Salt Permeability Testing—2001-8-SMRI-Part 2—The Influence of Permeability and Stress on Spherical Hollow Salt Samples". Solution Mining Research Inst. Research Project Report No. 20901-8-SMRI (Oct. 2001). 11 pgs. Incorporated in Technology Tutorlal by Dr. Joe Ratigan.
Breele, Y. et al. "Technico-Economic Study of Distributing Hydrogen for Automotive Vehicles"; International Journal of Hydrogen Energy, Elsevier Science Publishers B.V., Barking, GB, vol. 4, No. 4, Jan. 1, 1979, pp. 297-314, XP025578996, ISSN: 0360-3199, DOI: DOI:10.1016-0360-3199(79)90005-3 (retrieved on Jan. 1, 1979) p. 297-p. 299; Figure 2.
Brodsky, Nancy S. "Crack Closure and Healing Studies in WIPP Salt Using Compressional Wave Velocity and Attenuation Measurements: Test Methods and Results". Sandia National Laboratories, Contract No. 23-8484. SAND90-7076, (Printed Nov. 1990), 40 pgs. Incorporated in Technology Tutohal by Dr. Joe L. Ratigan.
Brouard et al. "Onset of Tensile Effective Stresses in Gas Storage Caverns". Solution Mining Research Institute, Fall 20907 Technical Meeting, Halifax, Canada (Oct. 8-10, 2007) 18 pgs. Incorporated in Technology Tutorial by Dr. Joe L. Ratigan.
Carter, et al. "Creep of Rocksalt". Elsevier Scientific Publishing Co., Amsterdam. Tectonophysics, 92 (1983) pp. 275-333. Incorporated in Technology Tutorial by. Dr. Joe L. Ratigan.
CGA G-5.3:1997 Commodity Specification for Hydrogen, Fourth Edition, by Compressed Gas Association, Inc. ("CGA Spec").
Chevronphillips Hydrogen Cavern, Clemens Terminal, Slides (No date available). 15 slides. Incorporated in Technology Tutorial by Dr. Joe L. Ratigan.
Costin et al. "Creep Healing of Fractures in Rock Salt". Issued by Sandia National Laboratories, SAND80-0392, Published by National Technical Information Service, US Dept. of Commerce. (Sep. 29, 1980) 33 pgs. Incorporated in Technology Tutorial by Dr. Joe L. Ratigan.
CSA Standard Z341.1-06 "Reservoir Storage". Canadian Standards Assoc., (Dec. 2006) 44 pgs. Incorporated in Technology Tutorial by Dr. Joe L. Ratigan.
CSA Standard Z341.2-06 "Salt Cavern Storage". Canadian Standards Assoc., (Dec. 2006) 59 pgs. Incorporated in Technology Tutorial by Dr. Joe L. Ratigan.
CSA Standard Z341.Series 06 "Storage of Hydrocarbons in Underground Formations". Canadian Standards Assoc., (Dec. 2006) 17 pgs. Incorporated in Technology Tutorial by Dr. Joe L. Ratigan.
Durup, Jean Gerard. "Long-Term Tests for Tightness Evaluations with Brine and Gas in Salt (Field Test No. 2 with Gas)". Research Project Report No. 94/0002-S. SMRI Research and Development Project Report. Presented at 1994 Fall Meeting, Hannover, Germany, 36 pgs. Incorporated in Technology Tutorial by Dr. Joe L. Ratigan.
ERC Guide. "Natural Gas Storage in Salt Caverns—A Guide for State Regulators". Prepared by Energy Resources Committee of the Interstate Oil and Gas Compact Commission (Reprinted Feb. 1998). 68 pgs. Incorporated in Technology Tutorial by Dr. Joe L. Ratigan.

(56) References Cited

OTHER PUBLICATIONS

Evans, D.J. 2007. An appraisal of Underground Gas Storage technologies and incidents, for the development of risk assessment methodology. British Geological Survey Open Report, OR-07-023, 288 pgs.
Foh, Stephen et al. "Underground Hydrogen Storage Final Report". Institute of Gas Technology. Department of Energy and Environment, Brookhaven National Laboratory, Upton, NY, (Dec. 1979) 283 pgs. Incorporated in Technology Tutorial by Dr. Joe L. Ratigan.
Fuenkajorn et al. "Dilation-Induced Permability Increase Around Caverns in Salt". Rock Mechanics, Nelson & Laubach (eds) © 1994 Balkema, Rotterdam, ISBN 90 54 10 380 8, 8 pgs. Incorporated in Technology Tutorial by Dr. Joe L. Ratigan.
H2 Salt Dome Storage System PFD, Sep. 9, 2003 ("PFD").
Handbook of Compressed Gases (Van Nostrand Reinhold Company)—Hardcover (1990), by Compressed Gas Association, Compressed Gas Association Staff, 3rd ed., ISBN: 0442218818,ISBN-13: 9780442218812 ("CGA Handbook").
Hansen et al. "Elasticity and Strength of Ten Natural Rock Salts". First Conf. on Mechanical Behaviour of Salt. Pennsylvania State Univ. (Nov. 9-11, 1981). Incorporated in Technology Tutoriai bv Dr. Joe L. Ratigan.
Hydrogen Reliability Salt Cavern Case Study Oil Sands Heavy Oil Technologies Conference and Exhibition—Jul. 14-16, 2009, Alberta Canada, available at <http:--www.slideshare.net-chojsm1-hydrogen-reliability-cavern-storage>; Published Jul. 20, 2009 ("Slides").
Investment in Gulf Coast to expand facilities and services, Oct. 25, 2007 <http:--www.gasworld.com-investment-in-gulf-coast-to-expand- facilities-and-services-2146.article> (last visited Date).
Jacoby et al. "Salt Domes As a Source of Geothermal Energy". Mining Engineering (May 1974) pp. 34-39. Incorporated in Technology Tutorial by Dr. Joe L. Ratigan.
Johnson et al. "Salt Deposits in the United States and Regional Geologic Characteristics Important for Storage of Radioactive Waste". Y-OWI-SUB-7414-1 DE 85 013319, Prepared for the Office of Waste Isolation, Union Carbide Corp., Nuclear Div., US Dept. of Energy (Mar. 1978). 191 pgs. Incorporated in Technology Tutorial by Dr. Joe L. Ratigan.
Kelley J.H., and R. Hagler Storage, transmission and distribution of Hydrogen, Int. J. Hydrogen Energ., 5, 35-54, 1980 ("Kelly").
Lord, Anna S. et al., "A Life Cycle Cost Analysis Framework for Geologic Storage of Hydrogen: A User's Tool", Sandia Report (SAND2011-6221) Sandia National Laboratories (Sep. 2011), 60 pges.
Mahoney J.J. and Strachan, D.M. "Reduction of Sulfate by Hyrogen in Natural Systems: A Literature Review", Pacific Northwest Laboratory, Richland, VA (Jan. 1987, Rev. Jan 1988).
Marks' Standard Handbook for Mechanical Engineers, 9th Edition (1987) (pp. 7-18-7-19); Publisher: The McGraw-Hill Companies; ISBN: 007004127X; ISBN-13: 9780070041271.
Moss Bluff Storage Cavern, Operations and Maintenance Manual, Sep. 16, 2003 ("Ops Manual").
Mullaly, M A C. "Underground Storage in Thin Salt Layers on Teesside" Solution Mining Research Institute Meeting Paper presented in Manchester, UK (Oct. 1982) 10 pgs. Incorporated in Technology Tutorial by Dr. Joe L. Ratigan.
Nieland, JD. (2008). Salt cavern Thermodynamics-Comparison Between Hydrogen, Natural Gas and Air Storage. SMRI Fall Meeting, Austin, Texas, 215-234.
Oil and Gas, Examiner's Report and Proposal for Decision, Jul. 28, 2004 ("Permit Review").
Performance of Palladium Diffusers for Reliable Purification; (2002) Extended abstract of a paper presented at CS-MAX, San Jose, CA, Nov. 11-13 (pp. 141-143). ("Funke").
Pfeifle et al. "Correlation of Chemical Mineralogic, and Physical Characteristics of Gulf Coast Dome Salt to Deformation and Strength Properties". Solution Mining Research Inst., Research Project Report #94/0004-S (Jan. 1995) 116 pgs. Incorporated in Technology Tutorial by Dr. Joe L. Ratigan.
Popp et al. "Evolution of Dilatancy and Permeability in Rock Salt During Hydrostatic Compaction and Triaxial Deformation". Journal of Geophysical Research, vol. 106, No. B3 (Mar. 10, 2001) pp. 4061-4078. Incorporated in Technology Tutorial by Dr. Joe L. Raligan.
Pottier, J.D. et al. "Mass Storage of Hydrogen"; NATO ASI Series. Series E, Applied Sciences; Hydrogen Energy System: Production and Utilization of Hydrogen and Future Aspects; (Proceedings of the NATO Advanced Study Institute on Hydrogen Energy System, Utilization of Hydrogen and Future Aspects), vol. 295, Jan. 1, 1995, pp. 167-179, XP008139790, ISSN: 0168-132X, pp. 167-pp. 170; Figures 1-3, 8.
Praxair Commercializes Industry's Only Hydrogen Storage, Oct. 22, 2007 <http:--www.praxair.com-news-2007-praxair-commercializes-industrys-only-hydrogen-storage> (last visited Date).
Praxair Extending Hydrogen Pipeline in Southeast Texas—Oil & Gas Journal, vol. 90(34) (1992) (Praxair pipeline.
Praxair Hydrogen salt cavern schematic from Praxair, Inc. Mechanical Integrity Test, Hydrogen Storage Cavern #1, Sabine Storage 7 Operations, Inc. Project 11-640, Jan. 10, 2012, p. 56 (Cavern Structure).
Praxair Hydrogen Storage Project, TRRC Hearing, Jun. 10, 2004 ("Permit Presentation").
Praxair, Inc. Mechanical Integrity Test, Hydrogen Storage Cavern#1, Sabine Storage 7 Operations, Inc. Project 11-640, Jan. 10, 2012 ("5YR MIT").
Prudential Equity Group Conference, Speaker: Stephen F. Angel, Executive Vice President, Sep. 22, 2005, <http:--www.praxair.com-investor-relations-reports-filings-and-presentations-investor-presentations> (last visited Date).
Ratigan et al. "LPG Storage at Mont Belvieu, Texas: A Case History". SPE Advanced Technology Series, Reprinted from vol. 1, No. 1 (1993) pp. 204-209. Incorporated in Technology Tutorial by Dr. Joe L. Ratigan.
Ratigan et al. "Rock Mechanics Aspects of Natural Gas Storage in Domal Salt". Solution Mining Research Inst. Meeting Paper. Prepared for SMRI 1993 Fall Meeting, Lafayette, Louisiana (Oct. 25-26, 1993), 50 pgs. Incorporated in Technology Tutorial by Dr. Joe L. Ratigan.
Ratigan, Joe L. "Hydrogen Storage in Solution-Mined Caverns in Salt Domes". Presentation by Ratigan Engineering & Consulting LLC (No date available) 36 pgs. Incorporated in Technology Tutorial by Dr. Joe L. Ratigan.
Rezunenko et al. "Constructive and Operation of Rock-Salt Underground Helium Concentrate Storage", SMRI Fall Meeting (Oct. 3-6, 1999).
Stolten, Detlef, ed. Hydrogen and fuel cells: fundamentals, technologies and applications. John Wiley & Sons, 2010 ("Stolten").
Stormont et al. "Laboratory Study of Gas Permeability Changes in Rock Salt During Deformation". Int. J. Rock Mech. Sci. & Geomech. Abstract, vol. 29, No. 4 (1992) pp. 325-342. Incorporated in Technology Tutorial by Dr. Joe L. Ratigan.
Sutherland et al. "Argon Gas Permeability of New Mexico Rock Salt Under Hydrostatic Compression". Int. J. Rock Mech. Sci. & Geomech. Abstracts, vol. 17, Pergamon Press Ltd. (1980), pp. 281-288. Incorporated Technology Tutorial by Dr. Joe L. Ratigan.
Tek, M. R. (1996). Natural gas underground storage: inventory and deliverability. PennWell Publishing. ISBN: 0878146148; ISBN-13:9780878146147 ("Tek").
Thoms et al. "Survey of Existing Caverns in U.S. Salt Domes". Solution Mining Research Institute Research Project No. 84-0002 (No date available) 47 pgs. Incorporated in Technology Tutorial by Dr. Joe L. Ratigan.
Thoms R. L. and Gehle, R.M. "A Brief History of Salt Cavern Use", Keynote Speech at Salt 2000 Conference (2000) no month.
USPTO Case IPR2015-01071, Patent Trial and Appeal Board Decision, Institution of Inter Partes Review, U.S. Pat. No. 7,078,011 B2, Apr. 2015.
USPTO Case IPR2015-01072, Patent Trial and Appeal Board Decision, Institution of Inter Partes Review, U.S. Pat. No. 7,078,011 B2, Apr. 2015.

(56) References Cited

OTHER PUBLICATIONS

USPTO Case IPR2015-01073, Patent Trial and Appeal Board Decision, Institution of Inter Partes Review, U.S. Pat. No. 7,078,011 B2, Apr. 2015.
USPTO Case IPR2015-01074, Patent Trial and Appeal Board Decision, Denying Institution of Inter Partes Review, U.S. Pat. No. 8,690,476 B2, Apr. 2015.
USPTO Case IPR2015-01075, Patent Trial and Appeal Board Decision, Denying Institution of Inter Partes Review, U.S. Pat. No. 8,690,476 B2, Apr. 2015.
USPTO Case IPR2015-01071, Patent Trial and Appeal Board Final Written Decision, U.S. Pat. No. 7,078,011 B2, Oct. 2015.
USPTO Case IPR2015-01072, Patent Trial and Appeal Board Final Written Decision, U.S. Pat. No. 7,078,011 B2, Oct. 2016.
USPTO Case IPR2015-01073, Patent Trial and Appeal Board Final Written Decision, U.S. Pat. No. 7,078,011 B2, Oct. 2016.
USPTO Case IPR2016-01079, Patent Trial and Appeal Board Decision, Denying Institution of Inter Partes Review, U.S. Pat. No. 8,690,476 B2, Nov. 2016.
Valenti, Richard M., Compressed Air Energy Storage (CAES) Act, KCC Rule Development, Kansas Corporation Commission, KCC Open Meeting, Issue 3 — Final (Jun. 16, 2010) 49 pages.
Venter, R.D. et al; "Modelling of Stationary Bulk Hydrogen Storage Systems"; International Journal of Hydrogen Energy, Elsevier Sci8ence Publishers B.V., Barking, GB, vol. 22, No. 8, Aug. 1, 1997, pp. 791-798, XP004075354, ISSN: 0360-3199, DOI: DOI:10.1016-S0360-3199(96)00210-8, p. 791-pp. 793; Tables 1, 2.

* cited by examiner

HYDROGEN SUPPLY METHOD AND SYSTEM

CROSS REFERENCE TO RELATED APPLICATIONS

This application is a continuation of and claims the benefit of priority from U.S. application Ser. No. 14/574,945, filed Dec. 18, 2014, which, in turn, is a continuation of and claims the benefit of priority from U.S. application Ser. No. 13/398,482, filed Feb. 16, 2012, now U.S. Pat. No. 8,950,419, each which is incorporated by reference in its entirety.

FIELD OF THE INVENTION

The present invention relates to a hydrogen supply method and system for supplying additional hydrogen to a hydrogen pipeline from a salt cavern to assist in meeting customer demand for hydrogen. More particularly, the present invention relates to such a method and system in which the stored hydrogen is removed from the salt cavern as a crude hydrogen stream that is thereafter diluted with higher purity hydrogen from the pipeline to form a hydrogen product stream at or below a product purity specification.

BACKGROUND OF THE INVENTION

Hydrogen is supplied to customers connected to a hydrogen pipeline system. Typically, the hydrogen is manufactured by steam methane reforming in which a hydrocarbon and steam are reacted at high temperature in order to produce a synthesis gas containing hydrogen and carbon monoxide. Hydrogen is separated from the synthesis gas to produce a hydrogen product stream that is introduced into the pipeline system for distribution to customers that are connected to the pipeline system. Alternatively, hydrogen produced from the partial oxidation of a hydrocarbon can be recovered from a hydrogen rich stream. Typically, hydrogen is supplied to customers under agreements that require availability and on stream times for the steam methane reformer or hydrogen recovery plant. When a steam methane reformer is taken off-line for unplanned or extended maintenance, the result could be a violation of such agreements. Additionally, there are instances in which customer demand can exceed hydrogen production capacity of existing plants. Having a storage facility to supply back-up hydrogen to the pipeline supply is therefore desirable in connection with hydrogen pipeline operations. Considering that hydrogen production plants on average have production capacities that are roughly 50 million standard cubic feet per day, a storage facility for hydrogen that would allow a plant to be taken off-line, to be effective, would need to have storage capacity in the order of 1 billion standard cubic feet or greater.

The large storage capacity can be met by means of salt caverns to store the hydrogen underground. Hydrogen as well as other gases have been stored in salt caverns. Salt caverns are large underground voids that are formed by adding fresh water to the underground salt, thus creating brine, which is often referred to as solution mining. Caverns are common in the gulf states of the United States where demand for hydrogen is particularly high. Such hydrogen storage has taken place where there are no purity requirements or less stringent (<96% pure) requirements placed upon the hydrogen product. In such case, the stored hydrogen from the salt cavern is simply removed from the salt cavern without further processing. Hydrogen storage has also occurred where there are more stringent purity requirements for the hydrogen within the pipeline, and, therefore, for the hydrogen that has been previously stored in the salt cavern that is to be introduced into the pipeline. In order to comply with the more stringent purity requirements, the stored hydrogen that is removed from the pipeline needs to be further processed to remove contaminants that have been imparted into the stored hydrogen by virtue of its storage within the salt cavern. For instance, U.S. Pat. No. 7,078,011 discloses a temperature swing adsorption unit for removing carbon dioxide and water from a hydrogen stream that has been stored in a salt cavern to produce a hydrogen product stream having the impurity level of the carbon dioxide and water vapor at or below the product purity specification. Such a purified hydrogen product stream can then be reintroduced into the pipeline. However, the implementation of purification equipment can substantially increase the cost and complexity of operating a hydrogen storage cavern.

As will be discussed, among other advantages of the present invention, a method and system for processing hydrogen that has been stored in a salt cavern is disclosed in which the hydrogen to be reintroduced into the pipeline will assist in meeting customer demand in a manner that is more cost effective than methods disclosed in the prior art.

SUMMARY OF THE INVENTION

The present invention requires hydrogen from the hydrogen pipeline to mix with the crude hydrogen stream. The crude hydrogen stream that is withdrawn from salt cavern is diluted to an acceptable product purity so as to enable assisting with customer demand. As will be explained, the crude hydrogen stream does not solely meet the customer demand, but, rather, relies on dilution with a predetermined portion of hydrogen from the hydrogen pipeline.

The present invention utilizes a method for processing a crude hydrogen stream withdrawn from stored hydrogen within a salt cavern. The crude hydrogen stream can be withdrawn at a flow rate to satisfy the hydrogen demand in a hydrogen pipeline. The crude stream contains at least one contaminant below a minimum level allowed by a product purity specification. A predetermined portion of a hydrogen product stream from the hydrogen pipeline mixes with the crude hydrogen stream. The mixture of the hydrogen product stream and the crude hydrogen stream has an acceptable product purity level suitable for downstream usage to an end-user. In this way, the present invention offers a more cost effective and simplified approach for operating a salt cavern containing stored hydrogen with at least one contaminant imparted by the salt cavern.

In a first aspect, a method is provided for supplying hydrogen from a salt cavern to assist in meeting end-user demand for hydrogen at a purity of greater than 99% that is supplied by a pipeline. The method comprises removing a crude hydrogen stream from the salt cavern having a first flow rate and containing at least one contaminant imparted by the salt cavern such that the at least one contaminant in the crude hydrogen stream does not meet a pre-established pipeline product purity specification. The crude hydrogen stream is mixed with a hydrogen dilution stream having a second flow rate to form a hydrogen product stream. The hydrogen dilution stream is formed from hydrogen in the pipeline and contains each of the at least one contaminants lower than the pre-established pipeline product purity specification. The first flow rate of the crude hydrogen stream or the second flow rate of the hydrogen dilution stream is controlled such that the hydrogen product stream contains hydrogen at the purity of greater than 99% with the at least one contaminant found in the crude hydrogen stream at or below the pre-established pipeline product purity specification. The hydrogen product stream is supplied to the end-user.

In a second aspect, a method is provided for supplying additional hydrogen from a reservoir of stored hydrogen in a salt cavern supplied at a purity of greater than 99% to an end-user through a hydrogen pipeline. The method comprises removing a first stream from the salt cavern at a first flow rate to discharge crude hydrogen from the salt cavern. The first stream comprises hydrogen and at least one contaminant imparted by the salt cavern such that the crude hydrogen contains the at least one contaminant at a level higher than that allowed by a product purity specification. The first stream is mixed at the first flow rate with a second stream comprising the at least one contaminant at or within the product purity specification at a second flow rate under flow rate conditions that form a third stream having lower levels of the at least one contaminant than contained in the first stream.

In a third aspect, a method is provided for supplying additional hydrogen to a hydrogen pipeline from a salt cavern to assist in meeting end-use demand. The method comprises removing stored hydrogen from the salt cavern at a first flow rate as a crude hydrogen stream containing at least one contaminant comprising at least carbon dioxide or water vapor contaminants at a level higher than that allowed by a product purity specification for the hydrogen in the hydrogen pipeline. The crude hydrogen stream is mixed at the first flow rate with a higher purity hydrogen from the hydrogen pipeline having a second flow rate under flow rate conditions to form a hydrogen product stream comprising hydrogen at a purity of greater than 99% with at least the carbon dioxide or the water vapor contaminants at concentrations at or below the product purity specification.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein.

DETAILED DESCRIPTION OF THE INVENTION

Figure 1:
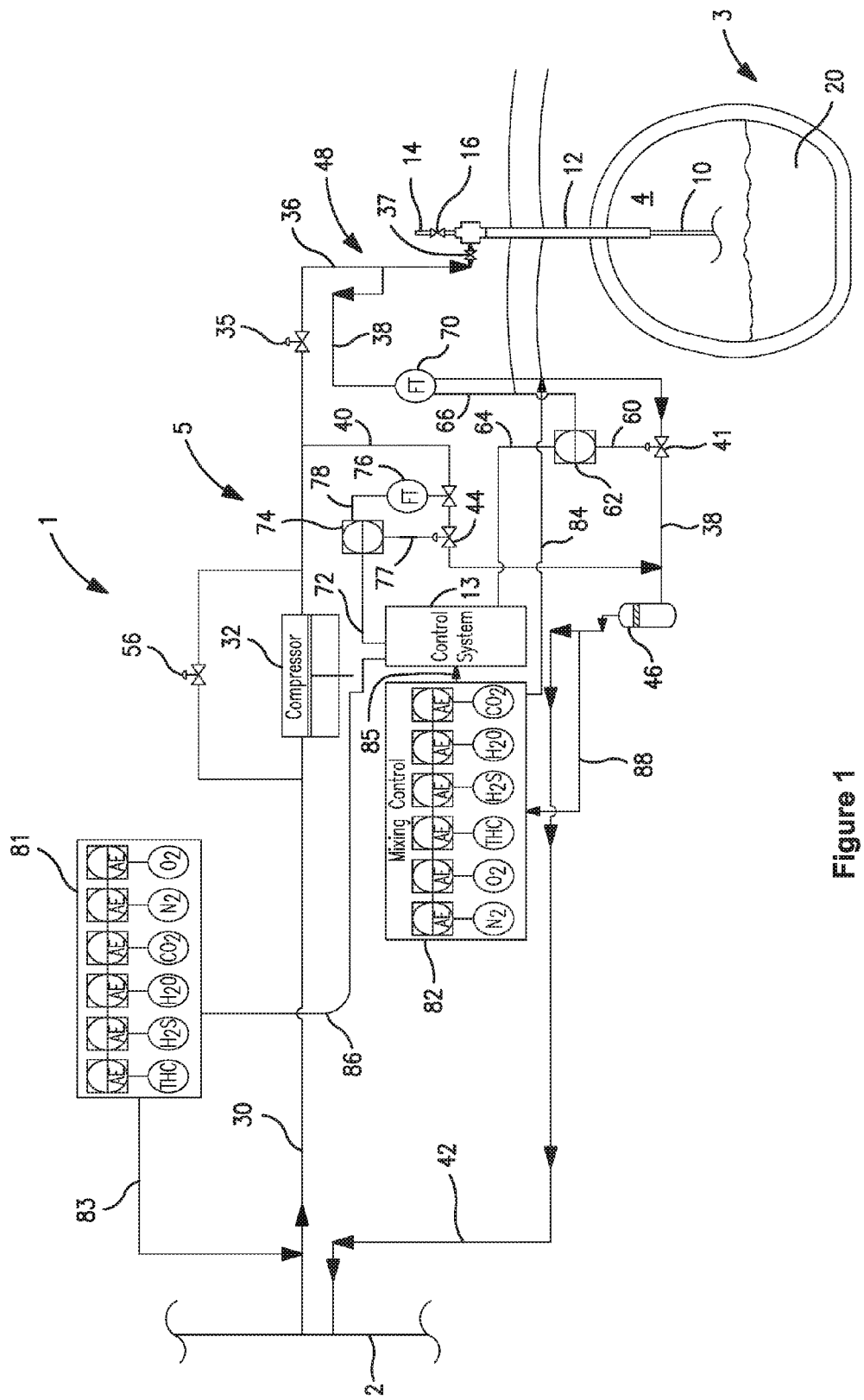
FIG. 1 shows a fragmentary schematic of a mixing process for storing and supplying hydrogen to a hydrogen pipeline incorporating the principles of the present invention.

As used herein and in the claims, all concentrations are expressed as volumetric or mole percentages. With reference to FIG. 1, a hydrogen storage and processing facility 1 is illustrated that is designed to remove hydrogen from a hydrogen pipeline 2 during periods of low customer demand and store such hydrogen within a salt cavern 3 as stored hydrogen 4. During periods at which demand for the hydrogen exceeds the capabilities of the hydrogen pipeline 2 to supply hydrogen to customers, stored hydrogen 4 is removed from the salt cavern 3 and used to assist in meeting the customer demand that cannot otherwise be supplied by production facilities feeding the hydrogen pipeline 2. In a manner that will be discussed, an outlet flow network 5 is provided to remove stored hydrogen 4 from the salt cavern 3 and then process and reintroduce the hydrogen so obtained from the salt cavern 3 back into the hydrogen pipeline 2 to provide a supply of additional hydrogen to assist in meeting customer demand. The ability to assist meeting customer demand may be advantageous when one or more hydrogen generation facilities, such as for instance a steam methane reformer, is taken off-line or is required to divert hydrogen supply from a particular customer to another end-use application, such as for example, an oil patch production facility. It is to be noted that even when customer demand for hydrogen is not high or where demand is high, the stored hydrogen 4, after processing, can be sold in merchant applications and, therefore, not all of the stored hydrogen 4 removed from the salt cavern 3 is necessarily reintroduced into the hydrogen pipeline 2.

As known in the art, salt cavern 3 is formed by solution mining in which water is injected through a pipe known as a brine string 10. The water dissolves the salt, and the resulting brine during the mining operation is returned through the annular space (not shown) formed in the final well casing 12 or other conduit between the inner wall of the final well casing 12 and the outer wall of the brine string 10. After the solution mining operation is complete, the residual brine in the salt cavern 3 can be removed through the brine string 10 by pressure displacement resulting from injection of hydrogen through the final casing 12 or other conduit. Once the brine level reaches the bottom of the brine string 10, a top section 14 of the brine string 10 is sealed off by a valve 16 and a residual brine layer 20, also known as a brine sump, remains in the bottom of the salt cavern 3.

As is also known in the art, contaminants will invariably be introduced into the stored hydrogen 4 thereby causing the stored hydrogen 4 in the salt cavern 3 to no longer meet the pre-established pipeline product purity specifications. The contamination can be in the form of a mixture of several light hydrocarbons, carbon dioxide, hydrogen sulfide and water vapor that is introduced into the stored hydrogen 4 from the walls of the salt cavern 3 and the residual brine layer 20. By way of an example, although the hydrogen introduced into the salt cavern 3 can have a hydrogen purity of about 99.99%, the purity of the stored hydrogen 4, will fall to less than about 99.99% due to the introduction of the following contaminants: carbon monoxide and carbon dioxide greater than about 1 ppmv; nitrogen and argon less than about 100 ppmv; total hydrocarbon contamination ("THC") of greater than about 1 ppmv; oxygen contamination of less than about 1 ppmv; water vapor greater than about 1 ppmv; and hydrogen sulfide of about 1 ppmv.

The product purity specification for the hydrogen that is to be drawn from the hydrogen pipeline 2 is typically established by the end-user needs and will generally be greater than about 95% hydrogen purity. Product purity specifications can range between about 97% and about 98%, and, in some instances, can be greater than about 99%. The product purity specification for the hydrogen pipeline is in line with the foregoing end-user requirements and, therefore, the hydrogen purity for such purposes can be greater than about 99.99%, with the nitrogen and argon specification less than about 100 ppmv and the balance of the contaminants less than about 1 ppmv.

When customer demand for the hydrogen, supplied by hydrogen pipeline 2 is low or for any reason, production exceeds demand, a hydrogen stream 30 can be removed from the hydrogen pipeline 2 and introduced into the salt cavern 3. In this regard, a bypass valve 56 is set in a closed position, a valve 35 is set in an open position and a control valve 44, to be discussed, is set in a closed position to allow hydrogen stream 30 to be compressed in a hydrogen compressor 32 to produce a compressed hydrogen stream 34. Hydrogen compressor 32 is typically a compressor having a piston that reciprocates to compress the hydrogen stream 30 withdrawn from the hydrogen pipeline 2. The compressor 32 is conventionally controlled to maintain the inlet pressure at a target suction pressure to maintain energy efficient operation of the compressor 32. Although not illustrated, hydrogen compressor 32 can conventionally incorporate a series of stages with interstage cooling between stages and an aftercooler to remove the heat of compression.

The compressed hydrogen stream 34 is introduced into the salt cavern 3 to form the stored hydrogen 4. The compressed hydrogen stream 34 flows through a conduit 36 connected to a transfer well head valve 37 and thereafter into an annular flow area (not shown) within final well casing 12 (between the inside of final well casing 12 and brine string 10) from which the compressed hydrogen feed stream 34 enters salt cavern 3. Well head valve 37 typically remains in an open position. In the illustrated embodiment, the compressed hydrogen stream 34 entering the salt cavern 3 is preferably compressed to a pressure above the pipeline pressure within the hydrogen pipeline 2 and as a result, the stored hydrogen 4 has a cavern pressure that is above pipeline pressure. Although not shown, the quantity of the compressed hydrogen stream 34 compressed by compressor 32 can be determined by instrumentation located at the inlet of the compressor 32. For example, the flow can be measured by an orifice meter, which is then corrected by the measured pressure and temperature. Such instrumentation may also provide a basis for assessing the integrity of the compressor 32, such as, for example, the detection of leaks. Additionally, the cavern pressure may be monitored and measured with a pressure transducer located within the conduit 36 through which the compressed feed stream 34 flows into the salt cavern 3. A flow meter may also be positioned at the inlet to the salt cavern 3 to determine the amount of hydrogen injected into the salt cavern 3.

When a hydrogen generation facility is taken off-line for any reason or when demand for hydrogen by customers otherwise exceeds the available production capabilities, stored hydrogen 4 can be removed from the salt cavern 3 to assist in meeting customer demand. Outlet flow network 5 is provided for such purposes and includes the following legs: "A" for flow of a crude hydrogen stream 38; "B" for flow of a hydrogen dilution stream 40; and "C" for flow of a hydrogen product stream 42. As used herein and in the claims, the term "legs" means flow paths within the outlet flow network 5 that are formed by suitable conduits. Such conduits would be positioned to conduct the flow of the aforementioned streams within the outlet flow network 5 as illustrated. Outlet flow network 5 is put to use by setting valve 35 in a closed position and a crude hydrogen stream 38 formed from the stored hydrogen 4 flows through a first leg "A" of the outlet flow network 5 by setting a control valve 41 contained in such leg in an open position. In a manner that will be discussed, control valve 41 is controlled so that crude hydrogen stream 38 has a first flow rate that will assist in meeting customer demand.

Crude hydrogen stream 38, for reasons discussed above, will have a higher level of contaminants than the hydrogen product specification and is therefore, processed by being diluted with a hydrogen dilution stream 40 that is introduced into a second leg "B" of the outlet flow network 5. As illustrated, second leg "B" is connected to first leg "A" by means of a piping tee or the like. A second flow rate of the hydrogen dilution stream 40 is controlled by a flow control valve 44 located in second leg "B". Depending upon the pressure of crude hydrogen stream 38, hydrogen dilution stream 40 can be formed from compressed hydrogen stream 34 by operating compressor 32 at such time or alternatively, without the compressor 32, by opening by-pass valve 56 with the compressor 32 shut down. When cavern pressure is low, pipeline pressure within the hydrogen pipeline 2 can be sufficient to mix the hydrogen dilution stream 40 with crude hydrogen stream 38. It should be noted that it is possible to conduct an embodiment of the present invention in which the cavern pressure would not be sufficient to withdraw the crude hydrogen stream 38 into mixing vessel 46 for mixing with the hydrogen dilution stream 40. In such an embodiment, an additional compressor (not shown) may be used to compress the crude hydrogen stream 38 that is withdrawn from the salt cavern 3 to a pressure above pipeline pressure.

Within the outlet flow network 5, a mixing vessel 46 is connected to the first and second legs "A" and "B" such that the hydrogen dilution stream 40 mixes with the crude hydrogen stream 38 within the mixing vessel 46, and a product hydrogen stream 42 is produced that is introduced into a third leg "C" that is connected to the hydrogen pipeline 2. Any suitable device as known in the art for mixing gases may be employed. Mixing vessel 46 can be a gas blender having baffles to increase turbulence of the gases to enhance mixing. Alternatively, mixing vessel 46 may be a piping manifold with or without selectively placed mixing elements which creates a tortuous gas flow pathway to enhance mixing in which the hydrogen dilution stream 40 and the crude hydrogen stream 38 can flow co-currently or counter currently relative to each other. It should be noted that the necessary mixing in the present invention may also be carried out without the use of a mixing vessel 46.

It is important to point out that hydrogen generation facilities, such as steam methane reformers, will generally form pipeline hydrogen having contaminant levels significantly less than the product purity specification. Consequently, hydrogen dilution stream 40, composed from the pipeline hydrogen, will tend to have contaminant levels that are sufficiently lower than the crude hydrogen stream 38 to ensure that the crude hydrogen stream 38 can be diluted to at or below the product purity specification. In this regard, the hydrogen dilution stream 40 will contain contaminants at levels that are no greater than about 80 percent of the specification. Contaminant levels within the hydrogen flowing within hydrogen pipeline 2 that are about 50 percent of the contaminant levels in the hydrogen product purity specification are typical. As can be appreciated, higher contaminant levels in the hydrogen dilution stream 40 will result in a decrease in the ability to use stored hydrogen 4 because the ability to dilute the stored hydrogen 4 to form a hydrogen product stream 42 will decrease.

As mentioned above, compressor 32 may be used to form a hydrogen dilution stream 40. The amount of compression will at least partially be dependent upon the pressure of crude hydrogen stream 38 to ensure that the hydrogen dilution stream 40 is sufficiently pressurized to mix with the crude hydrogen stream 38. In this regard, a control valve would be opened (not shown) to allow a portion of the hydrogen from the hydrogen pipeline 2 to be directed to the inlet of the compressor 32. Bypass valve 56 would be closed so that hydrogen stream 30 is fed to the inlet of the compressor 32. The compressor 32 includes an aftercooler, which can be employed to remove the heat of compression. The aftercooler is a known device in the art consisting of a heat exchanger utilizing cooling water and a draft fan. The removal of heat from the compressed hydrogen dilution stream 40 can be performed to achieve a temperature that is substantially the same as the crude hydrogen stream 38 to minimize errors between expected and measured flow rates. For purposes that will be discussed, the second flow rate of the hydrogen dilution stream 40 is measured by a flow transducer 76. Flow transducer 76, in a manner known in the art, may be optionally compensated for temperature and pressure effects through temperature and pressure measurements made by pressure and temperature transducers (not shown).

Alternatively, if the hydrogen pipeline pressure is sufficiently high, as compared with cavern pressure within salt cavern 3, the hydrogen dilution stream 40 may be formed from the hydrogen pipeline 2 by free flowing the hydrogen directly from the hydrogen pipeline 2 to mixing vessel 46 without a compressor 32. As also mentioned above, by-pass valve 56 is set in an open position for such purposes. Compression of the product stream 42 can be compressed, if necessary, to ensure that the product stream 42 is sufficiently pressurized to be introduced into the hydrogen pipeline 2.

A further option, when compressor 32 is not used in forming the hydrogen dilution stream 40, is to throttle crude hydrogen stream 38 so that the crude hydrogen stream 38 incurs a pressure drop to ensure the mixing of crude hydrogen stream 38 with hydrogen dilution stream 40 in mixing vessel 46. On this point, in most cases, the expansion of hydrogen dilution stream 40, upon entry into mixing vessel 46, will result in an increase in temperature by virtue of its negative Joule Thompson coefficient. As a result, heat may be removed from the hydrogen dilution stream 40 to ensure the accurate metering and control of its flow rate prior to mixing with crude hydrogen stream 38. Again, flow rate measurements of the hydrogen dilution stream 40 by flow transducer 76 can be compensated for such temperature effects through temperature measurements made by temperature transducers (not shown). After mixing has occurred in mixing vessel 46, the product stream 42 can be compressed, if necessary, to allow the introduction of the product stream 42 back into the hydrogen pipeline 2.

It is to be further noted, embodiments of the present invention are contemplated in which one or more contaminants may be removed from the crude hydrogen gas stream 38 prior to mixing and/or after mixing with hydrogen dilution stream 40. For instance, water vapor may be removed from crude hydrogen stream 38 by a condensation unit before mixing with hydrogen dilution stream 40 in the mixing vessel 46. However, in the illustrated embodiment, the necessary amount of contaminated hydrogen is advantageously withdrawn from the salt cavern 3 as crude hydrogen stream 38 to meet production demand without the need to remove any contaminants contained therein.

Preferably, the control of the flow rates of the crude hydrogen stream 38 and the hydrogen dilution stream 40 are automated by means of a control system 13. The control system 13 can take many forms that are known in the art. No particular form of such control for purposes of practicing the present invention is preferred. For example a supervisory control system can incorporate supervisory control and data acquisition software that can be obtained from a variety of sources. Such software can reside on a dedicated computer that interfaces over a local area network with an automated control system, such as, for example, a control system incorporating model predictive control or other automated control of less sophistication. Connected to the supervisory control system are controllers 62 and 74 for which targets are set by the supervisory control system. The controllers 62 and 74 could be proportional, integral or differential controllers, each of which is well known in the art and that can be obtained from a variety of suppliers. Additionally, all of the electrical connections mentioned above with respect to such control or other controllers mentioned herein can either be hard wired or radio signals. The controllers 62 and 74 in turn control flow control valves 41 and 44, respectively and therefore, the first and second flow rates.

Analyzer banks 81 and 82 are also provided. Impurity concentration measurements are performed by analyzer banks 81 and 82. Control system 13, in a manner to be discussed, sets the flow rate targets for the controllers 62 and 74 on the basis of impurity concentration measurements within crude hydrogen stream 38 and hydrogen stream 30. Analyzer bank 81 measures the hydrogen purity level and concentration of impurities within the hydrogen stream 30. Analyzer bank 82 measures the concentration of hydrogen and the various contaminants (e.g., $H_2$, THC, $H_2S$, $H_2O$, CO2/CO, $N_2$ and $O_2$) of the crude hydrogen stream 38. Although not illustrated, suitable microprocessor based designs of the analyzers 81 and 82 may correct for temperature and pressure, thereby improving the sensing accuracy of the sensing elements of the analyzers 81 and 82. Analyzers 81 and 82 may comprise any suitable type of sensing element as known in the art. For instance, electrochemical sensor elements may be employed.

A sample line 83 is provided to feed a sample of the hydrogen stream 30 to each sensing element (e.g., $H_2$, THC, $H_2S$, $H_2O$, CO2/CO, $N_2$ and $O_2$) that is contained in analyzer bank 81. Each of these impurities diffuse into the sensing element and each of the sensors undergo an electrochemical reaction in which current is generated. The amount of electrical current generated is proportional to the amount of contaminants present in each of the sensors. A signal that is referable to the measured impurity concentration is then transmitted through electrical connection 86 from the analyzer bank 81 to the control system 13. Similarly, analyzer bank 82 is configured to measure hydrogen and impurity contamination contained in crude hydrogen stream 38. Sample line 84 feeds a sample of the crude hydrogen stream 38 to each sensing element that is contained in analyzer bank 82. A signal that is referable to the measured impurity concentration is then transmitted through electrical connection 85 from the analyzer bank 82 to the control system 13. The sampling of crude hydrogen stream 38 is intended to be a representative measurement of the composition of the hydrogen and the contaminants of the stored hydrogen 4. Alternatively, an analyzer probe (not shown) or other suitable instrumentation as known in the art may be directly inserted into the well casing 12 for measurement of the hydrogen purity level and the other contaminants of the stored hydrogen 4 within the salt cavern 3. It should be also understood that a single analyzer can measure both the hydrogen stream 30 and the crude hydrogen stream 38.

A sample line 88 is also provided for the measurement of each of the impurities THC, $H_2S$, $H_2O$, CO2/CO, $N_2$ and $O_2$ contained in hydrogen product stream 42 by the analyzer bank 82. A signal referable to the hydrogen and signals corresponding to the contaminants levels are transmitted through electrical connection 85 from the analyzer 82 to the control system 13.

The stored hydrogen 4 is withdrawn from the salt cavern 3 as a crude hydrogen stream 38. In this regard, the flow rate of the crude hydrogen stream 38 is regulated to a predetermined set point value by a control valve 41. The controller 62 controls the degree of opening of the control valve 41 through electrical connection 60 such that the flow rate of crude hydrogen stream 38 is regulated to a target flow rate Fc that is set by a supervisory level of control provided by a control system 13. This target flow rate is the flow rate required to be added to the hydrogen pipeline 2 in order to assist in meeting the increased demand. A flow transducer 70, connected to the controller 62 by an electrical connection 66, provides a signal to the controller 62 that is referable to the flow rate of the crude hydrogen stream 38 and the controller 62 regulates the degree of opening of control valve 41 so that the flow of crude hydrogen stream 38 meets the target flow rate. The controller 62 and control system 13 are connected to one another by electrical connection 64 so that the controller 62 can receive the target flow rate signal from the control system 13. A controller 74 responsive to a target flow rate for the hydrogen dilution stream 40 that is computed by control system 13 operates the control valve 44 through electrical connection 77. A flow transducer 76 generates a signal referable to the flow rate of the hydrogen dilution stream 40 that is fed to the controller 74 as an input through electrical connection 78 and the controller 74 controls operation of control valve 44 so that the flow rate of the hydrogen dilution stream 40 is at the target flow rate level. The controller 74 is connected to the control system 13 through electrical connection 72 to receive a signal referable to the target flow rate of hydrogen dilution stream 40. The target flow rate that is generated by control system 13 is that flow rate that will ensure necessary dilution of the one or more contaminants of the crude hydrogen stream 38 to produce a hydrogen product stream 42 having a product purity specification that can be reintroduced into the hydrogen pipeline 2.

Figure 2:
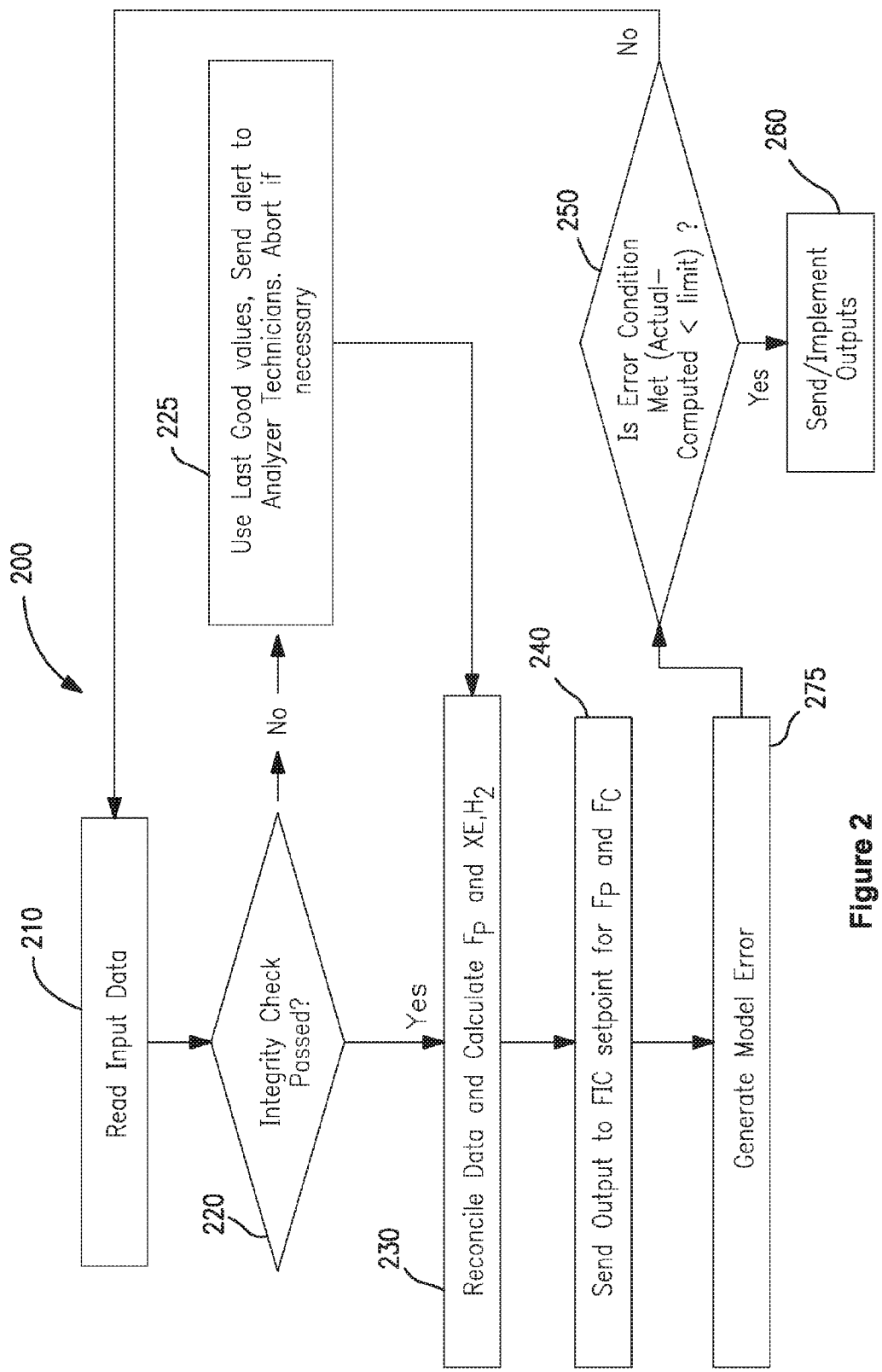
FIG. 2 shows a control logic incorporated into a control system that can be utilized for carrying out a method in accordance with the present invention.

With reference to FIG. 2, a control logic diagram 200 is illustrated that is incorporated into control system 13. In this embodiment, the deficiency in hydrogen demand is inputted and read into the control system 13 at step 210. This hydrogen demand deficiency sets the flow rate (Fc) of the crude hydrogen stream 38 to be withdrawn from the salt cavern 3. It should be noted that the present invention may also be operated to assist meeting customer demand so that the crude hydrogen stream 38 is withdrawn at a predetermined flow rate from the salt cavern 3 on a predictive basis, which may or may not satisfy the deficiency in hydrogen demand.

The target hydrogen composition and contaminant limits for the hydrogen product stream 42 are inputted and read by the control system 13. As mentioned above, hydrogen and impurity concentrations from the hydrogen pipeline 2 and the crude hydrogen stream 38 are sampled by analyzers 81 and 82, respectively, and thereafter transmitted as input values to the control system 13.

Next, integrity checks, at step 220, are performed to ensure that the current readings by analyzer 81 and 82 are reliable and accurate before using them in subsequent computations. Four integrity checks are conducted, each of which is required to be successfully met. The first integrity check requires the control system 13 computes a standard deviation based on the current reading and the historical data utilizing a sum of squares method as generally known in the art. The computed standard deviation is then compared against a predetermined minimum standard deviation to determine if it is greater than the predetermined minimum standard deviation to confirm whether the analyzers 81 and 82 are properly functioning. The predetermined minimum standard deviation is an inputted value based upon historical data. It is typically dependent upon a variety of factors, including for example the specific analyzer and the concentration variation typically observed for each of the measured contaminants in the hydrogen storage and processing facility 1. A computed standard deviation less than the predetermined minimum may be an indicator that the sensors of the analyzers 81 and 82 are not detecting the presence of hydrogen as well as their respective contaminants. The control system 13 also performs two integrity checks to confirm that such measurements are above a lower analyzer integrity limit and an upper analyzer integrity limit to ensure that the measured values are within a predetermined range that is typical for that measured reading. The lower and higher integrity limits are arbitrary values typically inputted by a user familiar with the behavior of the process and analyzer. The fourth integrity check requires the control system 13 to compute whether there is a percentage increase from the current reading to the previous reading and, if so, to determine whether such increase exceeds a predetermined value. Similar to the foregoing user inputs, this predetermined value is an arbitrary inputted value based upon on a variety of factors, including the specific analyzer employed and the concentration variation typically observed for hydrogen and each of the measured contaminants in the hydrogen storage and processing facility 1. If each of the four integrity checks passes, then the control system 13 determines that the analyzers are functioning properly and therefore the data is reliable for subsequent use in computations to be performed by the control system 13.

If one or both of the analyzers 81 and 82 are determined to not pass each of the four integrity checks, then the last stored values recorded in the control system 13 for that respective analyzer 81 or 82 can be utilized while notifying a technician to address the situation, as shown in step 225 of FIG. 2. The control logic 200 may limit the number of times the integrity checks will be allowed to fail before aborting the automated control system for mixing and allowing for manual intervention for the required mixing. These safeguards can ensure that the analyzers 81 and 82 are functioning properly and have not experienced any significant transient spikes or system perturbations. Assuming the integrity checks at step 220 for the concentration data measured by the analyzers 81 and 82 have been validated, the measured values are deemed reliable. The control logic 200 continues at step 230 to calculate the required flow rate (Fp) of hydrogen dilution stream 40 to mix with and dilute contaminants in the crude hydrogen stream 38 having a target flow rate of Fc. First, the control system 13 determines a Fp required to dilute each of the contaminants contained in the stored hydrogen 4. Different contaminant levels may require varying levels of Fp required for dilution to the product purity specification. As a consequence, for each contaminant having an impurity level that exceeds specification, the control system 13 performs overall material balance and contaminant material balances to calculate the flow rate (Fp) required for diluting the contaminant to a product purity specification. The control system 13 repeats the computation for each contaminant having an impurity level exceeding the product purity specification.

Next, the control system 13 determines which of the contaminants require the most dilution. Accordingly, the required flow rate (Fp) of hydrogen from the hydrogen pipeline 2 will be governed or dominated by the dilution required for such contaminant. In this manner, the control logic 200 calculates and determines the flow rate (Fp) to be withdrawn from the hydrogen pipeline 2 such that the crude hydrogen stream 38, when withdrawn from the stored hydrogen 4 in the salt cavern 3, will have a contaminant level that is at or below the product purity specification, whereby each of the contaminants is diluted to at least the product purity specification.

When the control logic 200 has calculated the required Fp to be withdrawn from the hydrogen pipeline 2, the computed levels for hydrogen and each of the contaminants ($X_{E,i}$) of hydrogen product stream 42 are determined. At this stage, the mixing process can begin. Control system 13 transmits target flow rates Fp and Fc to controllers 74 and 62, respectively, as shown at step 240. In particular, controller 74 receives a signal referable to the target flow rate Fp of the hydrogen dilution stream 40 through electrical connection 72, and controller 62 receives a signal referable to the target flow rate Fc of the crude hydrogen stream 38 through electrical connection 64.

The hydrogen dilution stream 40 and the crude hydrogen stream 38 are metered and controlled by their respective control valves 44 and 41. The hydrogen dilution stream 40 and the crude hydrogen stream 38 enter mixing vessel 46 to mix for a predetermined time period. Thereafter, the mixed stream emerges as hydrogen product stream 42. Corresponding sensors from analyzer bank 82 obtain a physical measurement of hydrogen product stream 42 at sample line 88. Signals are then transmitted from the analyzer bank 82 to the control system 13 that are referable to the hydrogen level and the impurity levels in hydrogen product stream 42. Integrity checks for each of the measured readings of hydrogen product stream 42 are performed as described above. If each of the integrity checks passes, the control system 13 then generates a model error for the measured hydrogen and each measured contaminant, as shown in step 245. A model error is evaluated by the control system 13 at step 250. The model error represents the relative error between the measured and calculated concentration for a particular component in the hydrogen product stream 42 and is computed as the deviation between a reconciled value and the expected or computed composition (as determined by the material balances discussed above). The reconciled value is a product of the current measured reading and the trailing or historical bias (i.e., current measured reading*trailing bias). By way of an example, if the water vapor analyzer from the analyzer 82 bank is historically reading on average 10% over the expected value, and the current measurement read by the water vapor analyzer 82 is 1 ppmv, then the reconciled value is taken to be 90% of the measured reading (i.e., 0.9 ppmv) to account for the bias in the water vapor analyzer 82. The bias can be based upon an instantaneous model error or a moving average of previous model errors, which are stored by the control system 13.

The calculated model errors for hydrogen and each contaminant are stored by the control system 13 and represent the updated bias which can be used for computing the model error of each component in the hydrogen product stream 42 in the next computing cycle. The frequency at which the control system 13 repeats the computing cycle shown in FIG. 2 may be programmed to occur at any time interval, and is, at least partially based on the rate of variation in flow rates and compositions of the hydrogen stream 30 and the crude hydrogen stream 38. In one example, the control system 13 repeats the computation about every two minutes.

It should be noted that to ensure reliability of the measurements taken at hydrogen product stream 42, a moving average of measurements may be obtained. In one example, the moving average consists of measurements repeatedly taken over five minutes.

If the model error for hydrogen and each contaminant are within an acceptable limit, then the hydrogen product stream 42 is exported to the hydrogen pipeline 2, as shown at step 260. Acceptable limits for each of the model errors are dependent upon the particular component being measured as well as the bias of the analyzer. For instance, an acceptable limit for one or more contaminants would be 10% of the relative error, where the relative error is defined as (reconciled value−calculated value)/(calculated value)*100%.

If the model error is outside an acceptable limit, the control system 13 may send an alarm to the operator. A control valve may also be provided to automatically stop the flow of hydrogen product stream 42 from being reintroduced back into the hydrogen pipeline 2. Manual operator intervention may be necessary to increase the additional amount of hydrogen dilution stream 40 required to increase the purity of the hydrogen product stream 42 to at least the product purity specification. Such manual intervention may be necessary when the control system 13 is programmed with constraints that limit the maximum amount of incremental hydrogen dilution stream 40 permitted to be made by control system 13 without manual intervention. In this case, the control means could be a human interface to allow a user to note pressure, flow rate and temperature readings and manually transmit set point values to controllers 62 and 74. If one or more of the error conditions is not satisfied at step 250, then the control system 13 and corresponding controllers 62 and 74 may be aborted to resolve the reason for the large model error. Even though the hydrogen product stream 42 is not within product purity specification as determined by the model errors, it may still be manually exported to the hydrogen pipeline 2. A decision to manually export the hydrogen product stream 42 can be appropriate when the volume of the hydrogen product stream 42 is relatively small in comparison to the volume of the hydrogen pipeline 2 (e.g., a ratio of 1:8 of the hydrogen product stream 42 to the pipeline stream on a volume basis) or the hydrogen product stream 42 marginally deviates from the product purity specification. In either case, the hydrogen product stream 42 can be adequately diluted within the hydrogen pipeline 2 to the product purity specification. Alternatively, the customer may be willing to accept the hydrogen product stream 42 when the customer is notified of the potential purity variance.

It should be noted that the control system 13 utilized to control the flow rate of the hydrogen dilution stream 40 (Fp) may operate based upon various other types of control approaches. For example, a pure feedback control methodology may be employed in which an initial estimate for the flow rate of the hydrogen dilution stream 40 is utilized based on the flow rate of crude hydrogen stream 38 withdrawn from the salt cavern 3. The initial estimate may be based upon on a variety of factors, such as for example, overall material balance, previously stored values of Fp or upon a simulated model utilized to predict Fp that is a function of a particular flow rate of the crude hydrogen stream 38. The hydrogen product stream 42 may be measured and thereafter, the flow rate of the hydrogen dilution stream 40 can be incrementally ramped up or ramped down proportionally, on a manual basis, until the desired composition of hydrogen product stream 42 is attained. The crude hydrogen stream 38 withdrawn from the salt cavern 3 can then be further incrementally ramped up and the flow rate of the hydrogen dilution stream 40 correspondingly increased, both of which can occur in a step-wise fashion until the desired flow rate Fc is achieved. Because of the slow rise at which concentration of the various contaminants may be observed to change in this particular hydrogen storage and processing facility 1, proper adjustments and ample response time to such adjustments are possible, thereby rendering such a feedback control methodology a viable approach. In this manner, the flow rate Fp of the hydrogen dilution stream 40 is regulated and fine tuned in response to the incremental ramp up of the flow rate of the crude hydrogen stream 38.

The control system 13 may also operate based upon pure feed forward control when the process behavior is well understood, the composition of the contaminants in the crude hydrogen stream 38 change slowly and there are no significant unexpected process disturbances. A pure feed forward control approach would predict the required flow rate Fp of the hydrogen dilution stream 40 and then regulate the flow rate to such predicted flow rate Fp value without measuring the composition of the hydrogen product stream 42. The concentration of the contaminants in the crude hydrogen stream 38 and the hydrogen dilution stream 40 can be measured as a basis for predicting the required flow rate Fp of the hydrogen dilution stream 40. The required hydrogen dilution stream 40 can then be based upon predictive simulation calculations. Alternatively, the concentration of contaminants in the crude hydrogen stream 38 may not be measured when the impurity levels will not appreciably change from the previously measured values. Such a scenario is possible when the salt cavern 3 is not substantially depleted of stored hydrogen 4 and/or the flow rate of the crude hydrogen stream 38 is relatively low. In such a case, historical values for the concentrations for the crude hydrogen stream 38 may be utilized to predict the required flow rate of the hydrogen dilution stream 40.

Further, although an automated control system has been discussed, it should be understood that the present invention can be implemented manually. For instance, a user may manually adjust the flow rates of crude hydrogen stream 38 and the hydrogen dilution stream 40 by virtue of forecasting the hydrogen demand in the hydrogen pipeline 2.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A method for supplying hydrogen from a salt cavern to assist in meeting end-user demand for hydrogen at a purity of greater than 99% that is supplied by a pipeline, the method comprising:
    removing a crude hydrogen stream from the salt cavern having a first flow rate and containing at least one contaminant imparted by the salt cavern such that the at least one contaminant in the crude hydrogen stream does not meet a pre-established pipeline product purity specification;
    mixing the crude hydrogen stream with a hydrogen dilution stream having a second flow rate to form a hydrogen product stream, the hydrogen dilution stream formed from hydrogen in the pipeline and containing each of the at least one contaminants lower than the pre-established pipeline product purity specification;
    controlling the first flow rate of the crude hydrogen stream or the second flow rate of the hydrogen dilution stream such that the hydrogen product stream contains hydrogen at the purity of greater than 99% with the at least one contaminant found in the crude hydrogen stream at or below the pre-established pipeline product purity specification; and
    supplying the hydrogen product stream to the end-user.

2. The method of claim 1, wherein the hydrogen in the hydrogen product stream has a purity greater than 99.9%.

3. The method of claim 1, wherein the second flow rate of the hydrogen dilution stream is controlled by:
    sampling concentration levels of the at least one contaminants in the crude hydrogen stream to generate a first measurement of the concentration levels;
    sampling concentration levels of the at least one contaminants in the hydrogen dilution stream to generate a second measurement of the concentration levels;
    utilizing the first measurement of the concentration levels and the second measurement of the concentration levels along with the first flow rate of the crude hydrogen stream to determine a calculated value of concentration levels of the at least one contaminants in the hydrogen product stream by performing material balances for each of the at least one contaminants in the crude hydrogen stream such that the calculated level of the contaminants in the hydrogen product stream will be at or below the pre-established product purity specification.

4. The method of claim 3, wherein integrity checks are performed to assess reliability of the first measurement of the concentration levels and the second measurement of the concentration levels.

5. The method of claim 3, further comprising:
    sampling concentration levels of the contaminants in the hydrogen product stream to generate a third measurement of the concentration levels;
    correcting the third measurement with a trailing bias value to generate a reconciled value;
    determining deviations between the reconciled value and the calculated value of concentration levels of contaminants in the hydrogen product stream to generate model errors;
    updating the trailing bias with the model errors for subsequent use of the trailing bias; and
    exporting the hydrogen product stream when the model errors are less than acceptable limits.

6. The method of claim 1, wherein stored hydrogen in the cavern is at a pressure that is above the pipeline pressure, such that at least a portion of the stored hydrogen is removed from the salt cavern as the crude hydrogen stream under impetus of the cavern pressure being higher than that of the pipeline pressure.

7. The method of claim 1, wherein none of the contaminants contained in the crude hydrogen stream are removed prior to mixing by the hydrogen dilution stream.

8. The method of claim 1, wherein the at least one contaminant contained in the crude hydrogen stream is partially removed prior to mixing by the hydrogen dilution stream.

9. The method of claim 8, wherein the at least one contaminant comprises water vapor.

10. A method for supplying additional hydrogen to a hydrogen pipeline from a salt cavern to assist in meeting end-use demand, the method comprising:
    removing stored hydrogen from the salt cavern at a first flow rate as a crude hydrogen stream containing at least one contaminant comprising carbon dioxide or water vapor contaminants at a level higher than that allowed by a product purity specification for the hydrogen in the hydrogen pipeline; and mixing the crude hydrogen stream at the first flow rate with a higher purity hydrogen from the hydrogen pipeline having a second flow rate under flow rate conditions to form a hydrogen product stream comprising hydrogen at a purity of greater than 99% with at least the carbon dioxide or the water vapor contaminants at concentrations at or below the product purity specification.

11. The method of claim 10, wherein a flow network is positioned between the hydrogen pipeline and the salt cavern to remove the higher purity hydrogen from the hydrogen pipeline to store in the salt cavern as the stored hydrogen, and to supply at least a portion of the stored hydrogen from the salt cavern to the hydrogen pipeline.

12. The method of claim 10, wherein at least part of the hydrogen product stream is supplied to an end-user.

13. The method of claim 10, wherein the first flow rate of the crude hydrogen stream is regulated to a target flow rate set by a control system.

14. The method of claim 13, wherein the control system sets the target flow rate on the basis of impurity concentration measurements taken within the crude hydrogen stream.

15. The method of claim 14, wherein the impurity concentration measurements are taken with an analyzer bank containing sensing elements.

16. The method of claim 15, wherein for each contaminant having an impurity level that exceeds the product purity specification, the control system performs overall material balance and contaminant material balances to calculate the second flow rate of the higher purity hydrogen required for reducing at least the carbon dioxide or the water vapor contaminants at or below the product purity specification.

17. The method of claim 10, wherein the product purity specification requires a balance of the contaminants to comprise at least light hydrocarbons, carbon monoxide or hydrogen sulfide at or below the product purity specification.

18. The method of claim 10, further comprising using a control system that controls the first flow rate of the crude hydrogen stream or controls the second flow rate of the higher purity hydrogen.

19. The method of claim 18, further comprising using the control system to regulate the second flow rate of the higher purity hydrogen to a target flow rate.

20. The method of claim 10, wherein none of the contaminants contained in the crude hydrogen stream are removed prior to mixing by the higher purity hydrogen.

21. The method of claim 10, wherein at least a portion of the water vapor contaminant contained in the crude hydrogen stream is removed prior to mixing with the higher purity hydrogen.

22. The method of claim 10, wherein the at least one contaminant in the crude hydrogen stream comprises water vapor and carbon dioxide.

23. The method of claim 10, wherein the higher purity hydrogen comprises hydrogen at a purity of greater than 99.9% and further comprises at least the carbon dioxide and the water vapor contaminants at a concentration that is no greater than 80% of the carbon dioxide and water vapor contaminant levels in the product purity specification.

* * * * *